S. C. Blodgett,
Hemmer.
No. 3,402. Reissued Apr. 27, 1869.

Witnesses.
Geo. H. Collins
S. J. Gordon

Inventor
Nathaniel Wheeler.
Assignee of
S. C. Blodgett.

N. PETERS, PHOTO-LITHOGRAPHER, WASHINGTON, D. C.

United States Patent Office.

NATHANIEL WHEELER, OF BRIDGEPORT, CONNECTICUT, ASSIGNEE OF SHERBURNE C. BLODGETT.

*Letters Patent No.* 10,386, *dated January* 3, 1854; *antedated July* 3, 1853; *extended seven years; reissue No.* 3,402, *dated April* 27, 1869.

IMPROVEMENT IN HEMMING AND CORDING UMBRELLA-COVERS.

The Schedule referred to in these Letters Patent and making part of the same.

*To all whom it may concern:*

Be it known that SHERBURNE C. BLODGETT, of Philadelphia, Pennsylvania, did invent a new and useful Apparatus for Hemming, or Cording and Hemming; and that the following, taken in connection with the drawings, is a full, clear, and exact description thereof.

In the drawings—

Figure 3:
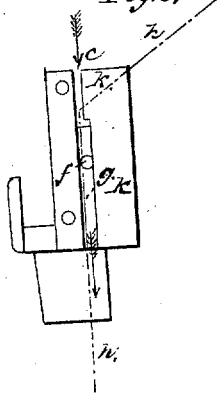

Figure 3, a bottom view with the bottom plate removed.

Figure 2:
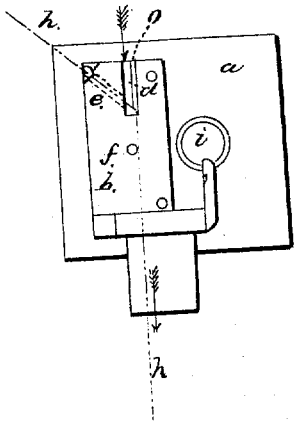
Figure 2 is a plan or top view of the same.
Figure 4:
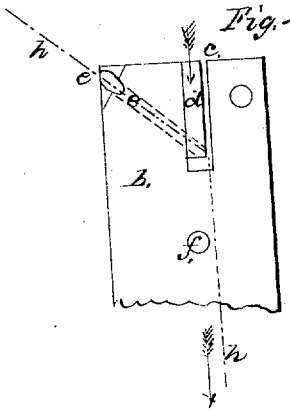
Figure 5:
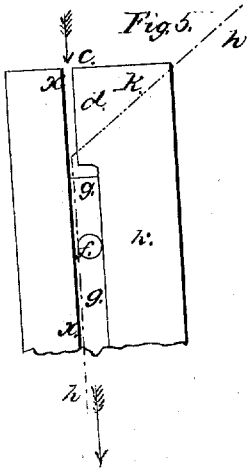

Figures 4 and 5 are representations of figs. 2 and 3 on an enlarged scale.

The same letters refer to the same parts in all the figures.

*a* is the bottom plate, on whose upper surface the material to be acted upon rests.

*b*, the piece of metal or shoe in which the slot and shelf that turn the hem, and the hole that guides the cord are formed.

*c*, the vertical part of the slot for the passage of the cloth.

*d*, the shelf over which the cloth is turned.

*e*, the hole that guides the cord, the direction of it being indicated by dotted lines.

*f*, the hole for the passage of the needle when the instrument is used in connection with a sewing-machine.

*g*, groove for the passage of the completed hem, or hem with a cord encased.

*h*, the cord.

*i*, the hole for screwing the instrument to a stand, when sewing by hand.

The shoe, when in use, is to be firmly secured to the bottom plate, and is provided with a perpendicular hole, for the passage of the needle when used with a sewing-machine.

Figure 1:
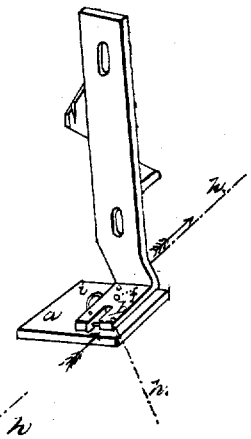
Figure 1 is a perspective view of the apparatus with its bottom plate attached.

The bottom of the shoe is also cut away from that side nearest the operator, up to the line *x x*, fig. 5, (see also, in this connection, fig. 1,) and the cloth, the edge of which is being hemmed, lies in the channel thus formed between the shoe and the bottom plate.

At the left-hand end of the shoe there is a perpendicular slot, or slit cut in it, sufficiently wide to admit the cloth, and extending through the top of the shoe, half way to the needle. This slot is closed at about that point, and then curves entirely round the right-hand end of a shelf, hereafter described, where it passes down to the under side of the shoe, in a sufficiently spiral form, and is thence continued to the right-hand end of the shoe in a straight line, in the form of a groove, covered at the top, nearly surrounding the hem when formed.

The shelf *d* is so called, from its form. It is a part of the shoe, does not reach up to the top of the shoe, and does not reach the bottom plate, and extends in the direction of the feed of the cloth, (see arrows,) to about the point where the side of the slot changes from the perpendicular to the horizontal.

This shelf supports the inner or concave side of the hem being turned, and as the vertical side of the slot gradually changes to horizontal, the cloth turned up at the edge by the hand of the operator, and drawn along by the feed-wheel of the machine, is turned over by the peculiar shape of the spiral, acting on its convex side until the cloth is doubled down on itself, and held so doubled by being pressed upon and partially enclosed by the groove, which has a horizontal top, as at *g g*, the cord being at the same time passed through the hole, and enclosed in the hem. (See red line.)

The slot, as a whole, is, therefore, first, a perpendicular slot; second, a spiral bridge; and third, a horizontal groove covered at top, and the spiral bridge is that part of the slot where its side curves from the vertical to the horizontal.

The inside of the slot that acts against the convex side of the cloth, is therefore a warped surface, gradually changing from a vertical to a horizontal one, and the cloth upon which the hem or corded edge is formed enters the passage bounded on one side by this surface, through the channel before described, between the bottom of the shoe and the top of the bottom plate, and this warped surface, used in connection with the feed of a sewing-machine, by their joint action, turns the cloth ninety degrees, the finger of the operator making the preliminary turn, with which the former completes the hem.

In the use of the apparatus, the cord is passed through the guide or hole. The cloth lies horizontally in the channel between the shoe and bottom plate, with the edge from the operator, and feeds from left to right, as shown by the arrows. The cloth being held by the left hand of the operator, turns up with the thumb what is sufficient for a hem, and enters it in the slot. As the cloth is carried forward by the feed-wheel of the machine, or by hand, it is turned over by the spiral bridge, and wrapped around the cord, carrying the cord along with it, and passes into the part of the slot that has a horizontal top, which presses the hem into shape, and presents it in proper relation to the needle, and preserves it in shape while being sewn, and for a short distance after the seam is formed.

I claim as the invention of SHERBURNE C. BLODGETT—

1. A warped surface, substantially such as described, to be used in a sewing-machine, for tusning hems, substantially as described.

2. In combination with the feed of a sewing-machine, a warped surface, substantially such as described, acting upon the convex side of the cloth, the combination being substantially such as described.

3. A warped surface, in shape substantially such as is described, in combination with a shelf, the two acting in combination, substantially as set forth.

4. In combination with a spiral bridge, acting on the convex side of the cloth, a horizontal groove, covered on the top, and extending to the needle, completing the hem, and holding it in shape to be stitched, the spiral and groove being substantially such as described.

5. In combination with a spiral bridge, acting on the convex side of the cloth, a horizontal groove, covered at top, and extending to and beyond the needle, these parts being substantially such as specified, and acting as described.

6. In combination with a warped surface, acting on the convex side of cloth, to fold it, and a shelf, acting to support the concave side of a fold, a hole or guide for the cord, all these parts being substantially such as specified, and acting in combination, as described.

7. In combination with a slot, and spiral bridge and a shelf, all being and acting substantially as described, a cord-guide and groove, covered at top, the whole forming a cording-apparatus.

8. In combination with a warped surface, substantially such as described, and capable of acting on the convex side of the material, a channel, in which the horizontal part of the cloth whose edge is being hemmed may lie, and through which it passes, as described.

9. A needle-hole, or aperture for the passage of a needle, in combination with a groove, covered at top, and so shaped, substantially as described, as to partially surround a hem, whereby the line of stitching may be suitably placed in relation to a hem partially enclosed in the groove, the combination being as described.

10. A warped surface, substantially such as described, in combination with a shelf and a channel, which the cloth being hemmed may traverse, the combination being substantially such as hereinbefore set forth.

Witnesses: NATHANIEL WHEELER.
GEO. H. COLLINS.
S. J. GORDON.